United States Patent [19]
Dokic et al.

[11] Patent Number: 6,101,598
[45] Date of Patent: Aug. 8, 2000

[54] METHODS FOR DEBUGGING A MULTIPROCESSOR SYSTEM

[75] Inventors: Miroslav Dokic; Raghunath Rao; Zheng Luo; Jeffrey Niehaus; James Divine, all of Austin, Tex.

[73] Assignee: Cirrus Logic, Inc.

[21] Appl. No.: 08/970,372

[22] Filed: Nov. 14, 1997

[51] Int. Cl.<sup>7</sup> ................................................ G06F 09/44
[52] U.S. Cl. ................ 712/227; 712/227; 712/231; 712/210; 712/212
[58] Field of Search ..................... 712/200 T, 32, 712/35, 39, 47, 66, 68, 898; 714/800 T

[56] References Cited

U.S. PATENT DOCUMENTS

| | | | |
|---|---|---|---|
| 5,361,348 | 11/1994 | Nakamoto | 714/38 |
| 5,574,871 | 11/1996 | Hoyt | 712/200 |
| 5,721,945 | 2/1998 | Mills | 712/35 |
| 5,729,556 | 3/1998 | Benbassat | 714/747 |
| 5,864,689 | 1/1999 | Tran | 712/208 |
| 5,915,083 | 6/1999 | Ponte | 714/38 |
| 5,919,255 | 7/1999 | Seshan | 710/262 |

*Primary Examiner*—Meng-Ai T. An
*Assistant Examiner*—Stacy Whitmore
*Attorney, Agent, or Firm*—James J. Murphy, Esq.; Peter Rutkowski, Esq.

[57] ABSTRACT

A method of operating a multiple processor device. A first word of a sequence of words is received in a register. A target processor is determined from the first word and the target processor is interrupted. An input ready bit is set and first word from in the register is read with the target processor. A number of words in the sequence to follow the first word determined from the first word. A word counter is set and the input ready bit is cleared with the target processor. The target processor is returned to main code execution.

14 Claims, 5 Drawing Sheets

METHODS FOR DEBUGGING A MULTIPROCESSOR SYSTEM

CROSS-REFERENCE TO RELATED APPLICATION

The following co-pending and co-assigned application contains related information and is hereby incorporated by reference: Ser. No. 08/970,979 now pending entitled "DIGITAL AUDIO DECODING CIRCUITRY, METHODS AND SYSTEMS, filed Nov. 14, 1997;

Ser. No. 08/970,794 now pending entitled "METHODS FOR BOOTING A MULTIPROCESSOR SYSTEM, filed Nov. 14, 1997;

Ser. No. 08/969,883 now pending entitled "INTER-PROCESSOR COMMUNICATION CIRCUITRY AND METHODS, filed Nov. 14, 1997;

Ser. No. 08/969,884 now pending entitled "METHODS FOR UTILIZING SHARED MEMORY IN A MULTIPROCESSOR SYSTEM, filed Nov. 14, 1997;

Ser. No. 08/970,796 U.S. Pat. No. 5,978,825 entitled "ZERO DETECTION CIRCUITRY AND METHODS, filed Nov. 14, 1997;

Ser. No. 08/970,841 U.S. Pat. No. 5,907,263 entitled "A VOLTAGE CONTROLLED CRYSTAL OSCILLATOR, filed Nov. 14, 1997;

Ser. No. 08/971,080 now pending entitled "METHOD FOR ERROR CONCEALMENT IN AN AUDIO DECODING SYSTEM, filed Nov. 14, 1997; and Ser. No. 08/970,302 now pending entitled "METHODS FOR EXPONENT HANDLING IN AN AUDIO DECODING SYSTEM, filed Nov. 14, 1997.

BACKGROUND OF THE INVENTION

1. Field of the Invention

The present invention relates in general to processing system debugging and in particular, to debugging a method multiprocessor system.

2. Description of the Related Art

The ability to process audio information has become increasingly important in the personal computer (PC) environment. Among other things, audio support is important requirement for in many multimedia applications, such as gaming and telecommunications. Audio functionality is therefore typically available on most conventional PCs, either in the form of an add-on audio board or as a standard feature provided on the motherboard itself. In fact, PC users increasingly expect not only audio functionality but high quality sound capability. Additionally, digital audio plays a significant role outside the traditional PC realm, such as in compact disk players, VCRs and televisions. As the audio technology progresses, digital applications are becoming increasingly sophisticated as improvements in sound quality and sound effects are sought.

One of the key components in many digital audio information processing systems is the decoder. Generally, the decoder receives data in a compressed form and converts that data into a decompressed digital form. The decompressed digital data is then passed on for further processing, such as filtering, expansion or mixing, conversion into analog form, and eventually conversion into audible tones. In other words the decoder must provide the proper hardware and software interfaces to communicate with the possible compressed (and decompressed) data sources, as well as the destination digital and/or audio devices. In addition, the decoder must also perform additional functions appropriate to the decoder subsystem of a digital audio system, such as the mixing of various received digital and/or audio data streams.

As with many combination hardware and software systems, an audio decoder must be provided with some means of allowing software debugging. This is especially true for complex audio decoder systems which can decode received data in any one of a number of formats, as well as perform a number of other desirable processing operations. In particular, the ability to perform debugging of any hardware/software system, such as an advanced audio decoder, during actual operation is of critical importance to overall system development and testing. Therefore, the need has arisen for methods of debugging complex combination hardware and software systems, including, but not limited to advanced audio decoders.

SUMMARY OF THE INVENTION

According to the principles of the present invention, methods of operating a multiple processor system is disclosed. According to one such method, the first word of a sequence of words is received in a register. A target processor is determined from the first word and the target processor is interrupted. An input ready bit is set and the first word is read from the register with the target processor. A number of words of the sequence of words to follow the first word is determined from the first word. A word counter is set and the input ready bit cleared with the target processor. The target processor is returned to main code execution.

The principles of the present invention allow for the efficient and accurate debugging of complex combination hardware and software systems. These principles may be particularly advantageously applied to a multiprocessor systems, including multiprocessor audio decoder systems.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1–5B of the drawings, in which like numbers designate like parts.

Figure 1A:
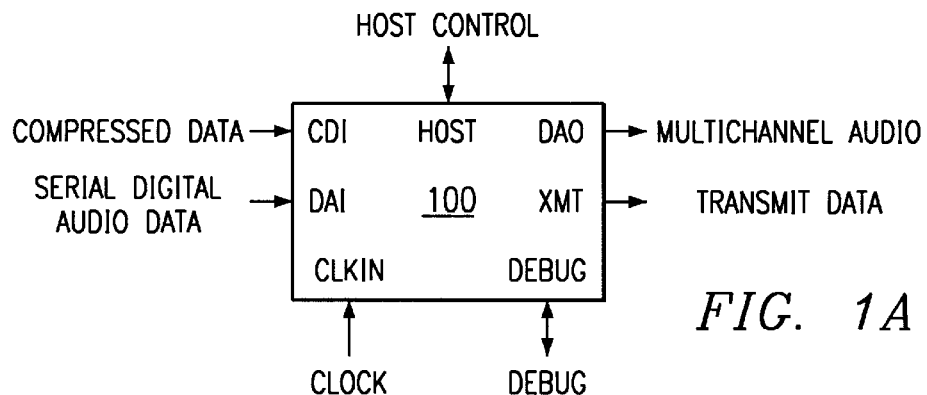
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data conforming to the AC-3 digital audio compression standard, (as defined by the United States Advanced Television System Committee) through a compressed data input port. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through a transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 bits streams.

Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency co-efficients. Generally, these overlapping blocks, each of 512 time samples, are multiplied by a time window and transformed into the frequency domain. Because the blocks of time samples overlap, each PCM input sample is represented by a two sequential blocks factor transformation into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encode each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC bit stream also includes additional information. For instance, each frame may include a frame header which indicates the bit rate, sample rate, number of encoded samples, and similar information necessary to subsequently synchronize and decode the AC-3 bit stream. Error detection codes may also inserted such that the processing device, such as decoder 100; can verify that each received frame of AC-3 data does not contain any errors. A number of additional operations may be performed on the bit stream before transmission to the decoder. For a more complete definition of AC-3 compression, reference is now made to the digital audio compression standard (AC-3 ) available from the Advanced Televisions Systems Committee, incorporated herein by reference.

In order to decompress under the AC-3 standard, decoder 100 essentially must perform the inverse of the above described process. Among other things, decoder 100 synchronizes to the received AC-3 bit stream, checks for errors and deformats received AC-3 data audio. In particular, decoder 100 decodes spectral envelope and the quantitized mantissas. A bit allocation routine is used to unpack and de-quantitize the mantissas. The spectral envelope is encoded to produce the exponents, then, a reverse transformation is performed to transform the exponents and mantissas to decoded PCM samples in the time domain.

Figure 1B:
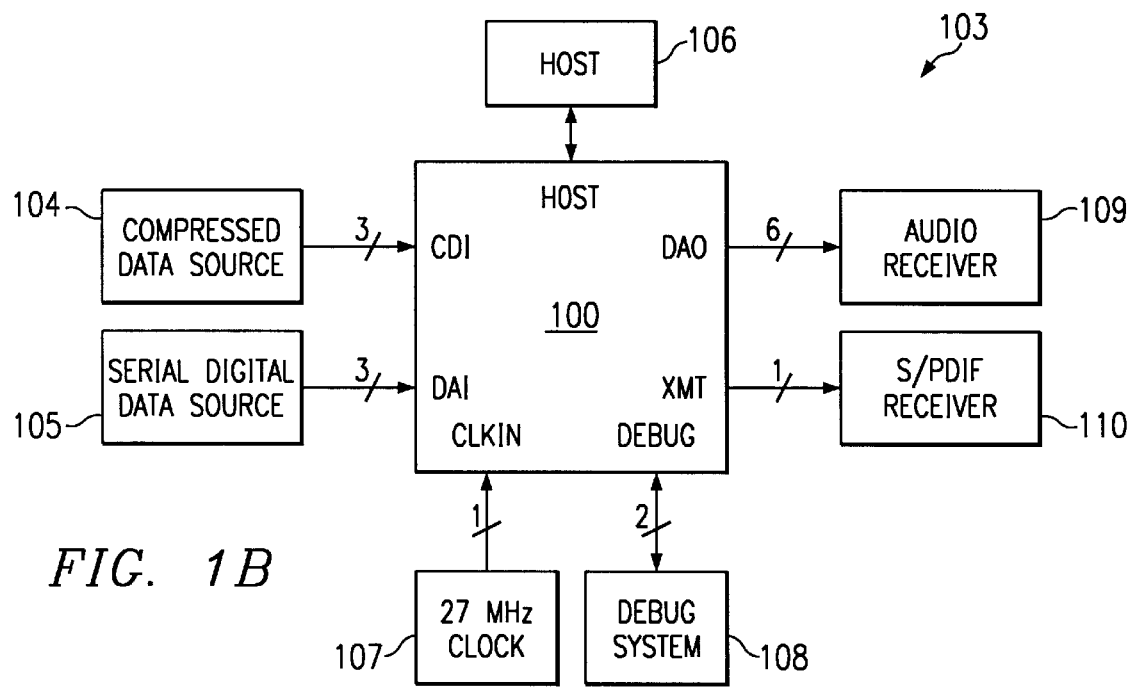
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio sources 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to a S/PDIF receiver 110. These outputs may be coupled, for example, to digital to analog converters or codecs for transmission to analog receiver circuitry.

Figure 1C:
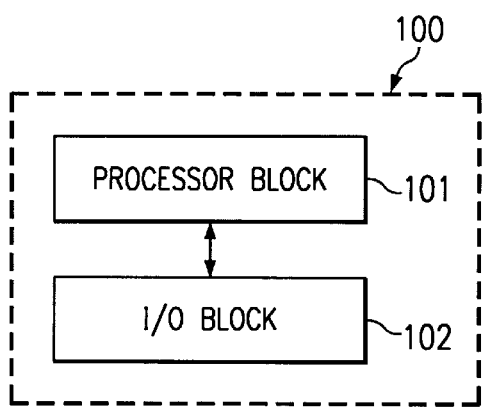
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and an I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
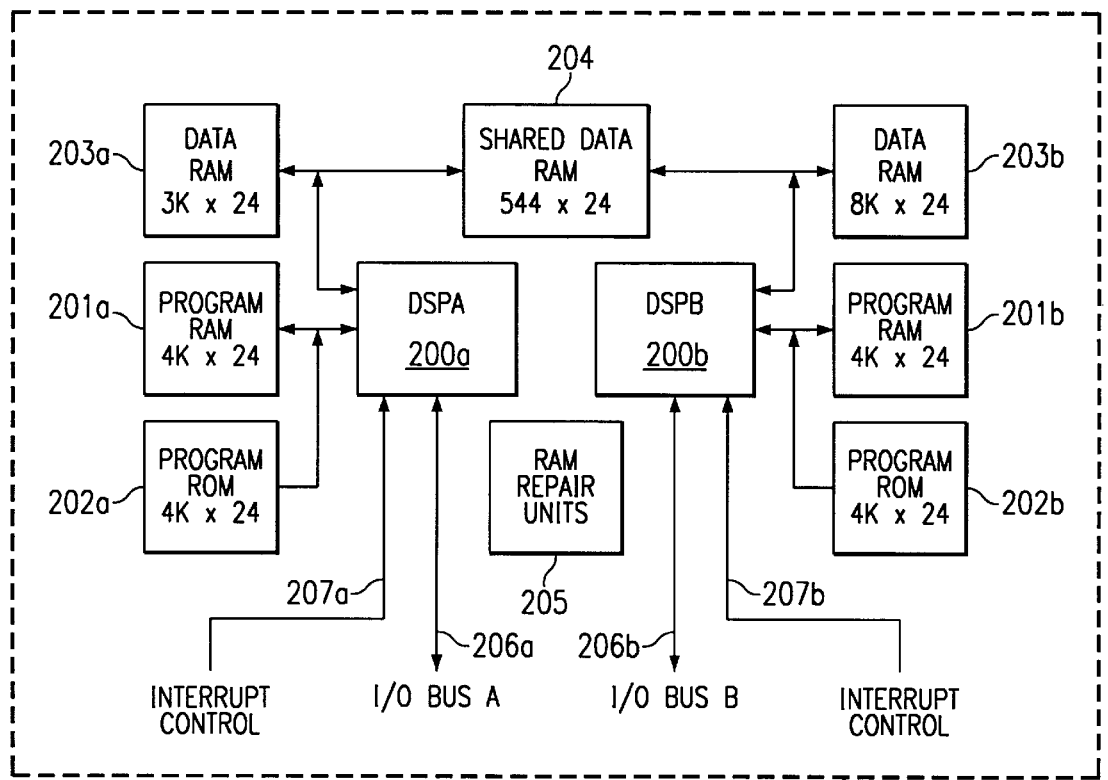
FIG. 2 is a diagram of the processor block of FIG. 1C.

FIG. 2 is a detailed functional block diagram of processor block 101. Processor block 101 includes two DSP cores 200a and 200b, labeled DSPA and DSPB respectively. Cores 200a and 200b operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b.

Processor block 101 also contains a RAM repair unit 205 that can repair a predetermined number of RAM locations within the on-chip RAM arrays to increase die yield.

DSP cores 200a and 200b respectively communicate with the peripherals through I/O Block 102 via their respective I/O buses 206a, 206b. The peripherals send interrupt and flag information back to the processor block via interrupt interfaces 207a, 207b.

Figure 3:
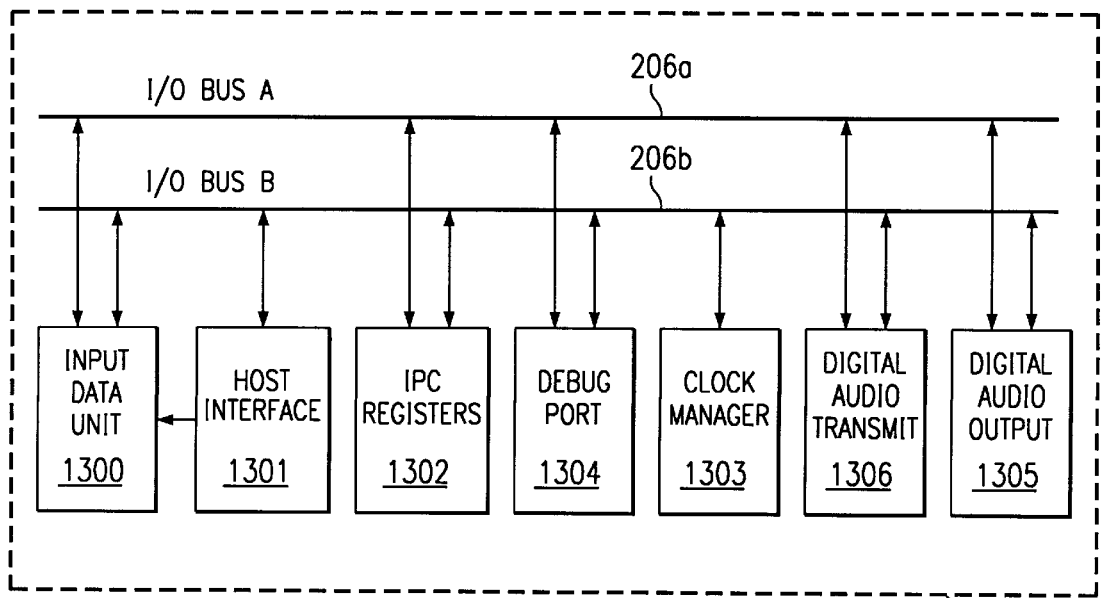
FIG. 3 is a diagram of the primary functional subblock of the I/O block of FIG. 1C.

FIG. 3 is a detailed functional block diagram of I/O block 102. Generally, I/O block 102 contains peripherals for data input, data output, communications, and control. Input Data Unit 1300 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time stamp information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200a) or DSPB (200b). Any read or write conflicts are resolved by treating DSPB as the master and ignoring DSPA.

For a more complete description of decoder 200 and its overall operation, specific reference is now made to application Ser. No. 08/970,979 now pending (Attorney Docket Number 0680-CS [2836-P058US]).

Figure 4A:
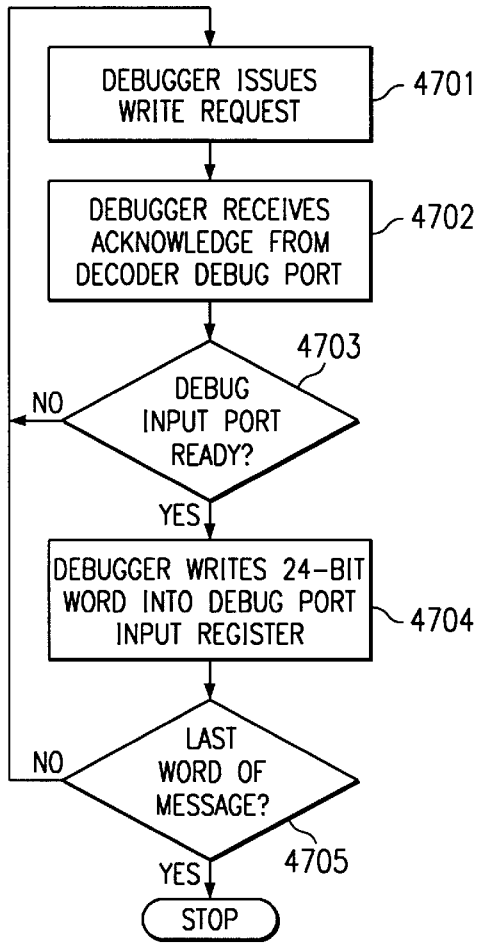
FIG. 4A is a diagram illustrating one method of handshaking between the decoder and an external debugger.
Figure 4B:
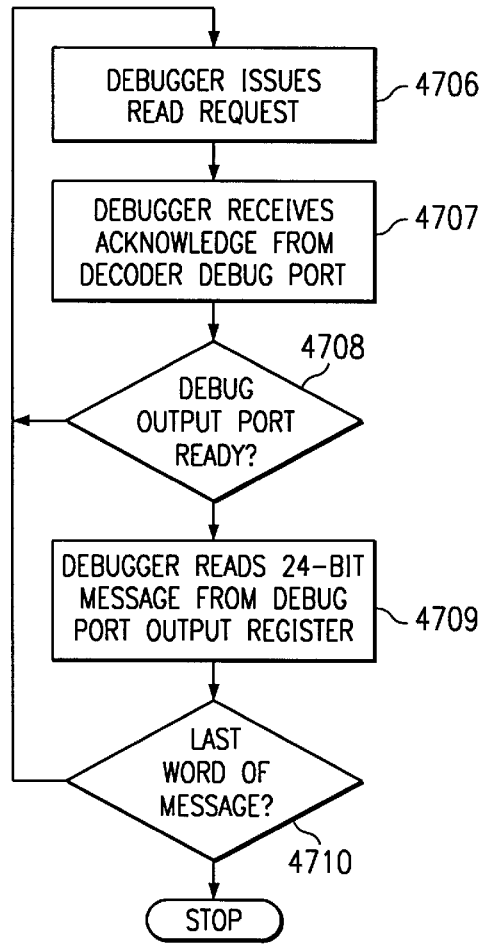
FIG. 4B is a diagram illustrating a second method of handshaking between the decoder and an external debugger.

The debug handshaking between decoder 100 and an external PC debugger system can be described in detail in conjunction with FIGS. 4, 4A and 4B. Additionally, the debug registers discussed below are further described in TABLES 1–3.

TABLE 1

Debug port Status Register (DBPST)
Pages 0–7 Address 0x0D

| Name | Bits | Description |
| --- | --- | --- |
| DBERR | 23 | Debug interrupt error. This bit is the logical AND of the DBINT bits from the two DBPST registers. When set, this bit |

TABLE 1-continued

Debug port Status Register (DBPST)
Pages 0–7 Address 0x0D

| Name | Bits | Description |
| --- | --- | --- |
|  |  | indicates that both DSPs are requesting exclusive interrupt privileges. Read-only. |
| ORDY | 22 | Output ready. When low, valid data is in DBOUT register waiting to be read by host. When high, the DBOUT register is empty and may be written with new output data. A rising edge of ORDY causes an interrupt if DBINT is set. Read-only. |
| IRDY | 21 | Input ready. When high, valid data is waiting in the DBIN register to be read by the DSP. The IRDY bit is cleared when written to by the associated DSP. |
| DBINT | 20 | Debut interrupt control. When set, the associated DSP is granted exclusive interrupt privileges from the debug port until cleared. |
| TEMP | 19:0 | Reserved bits. These bits are used by the debug software for temporary variable storage. |

TABLE 2

Debug port Input Register (DBIN)
Pages 0–7 Address 0x0C

| Name | Bits | Description |
| --- | --- | --- |
| DBIN | 23:0 | Debug port input data. Read-only. |

TABLE IS 3

Debug port Output Register (DBOUT)
Pages 0–7 Address 0x0C

| Name | Bits | Description |
| --- | --- | --- |
| DBOUT | 23:0 | Debug port output data. Write-only. |

A debug session begins with an external PC Debugger writing a debug message into the Debug port 1304. For each 24-bit write (FIG. 4A), the PC debugger issues a write request (Step 4701) by generating a falling edge of DBDA while holding DBCK (debug clock) high. It does not write any data until it confirms that IRDY (input ready) is low (Step 4703)(i.e., DSP has read out the last word written in) by reading an active-low ACK (acknowledge) on DBDA after the first falling edge of DBCK (Step 4702). If no ACK is received, it repeats the write request until it receives an ACK. It then writes in twenty-four bits of the message (Step 4704). Each 24-bit write into data input register follows the handshake procedure until the last word of the message is written to decoder 100 (Step 4705).

Similarly, for a 24-bit read from the decoder 100, the PC Debugger issues a read request by generating a rising edge of DBDA while holding DBCK high (Step 4706). It does not read any data till it confirms ORDY (output ready) is low (Step 4708)(i.e., DSP has written the next word to be read out) by reading an active-low ACK on DBDA after the first failing edge of DBCK (Step 4707). If no ACK is received, it repeats the read request till it receives an ACK. It then reads out 24-bits of the message. Each 24-bit read out of the data output register follows this above handshake procedure.

Debug port 1304 uses two I/O addresses in the lower (unpaged) half of the IO space: 0xa and 0xb. The DBIN and DBOUT registers share the 0xa address and contain the 24-bit word received from the PC Debugger, or to be transmitted to the PC Debugger, respectively. There are two status registers: the DBPST(A) register for DSPA and the DBPST(B) register for DSPB. Both these share the same IO address 0xb, and are visible only to their respective DSPs.

The DBPST(A/B) status registers have identical fields consisting of DBERR (debugging interrupt error), ORDY (output ready), IRDY (input ready), and DBINT (debug interrupt control)[1:0] bitfields. The DBTMP register is a scratch-pad register space for software backup of AR1 during a debug session. The ORDY bit, which is read-only in register DBPST(A/B), is identical for both DSPs 200a, 200b (i.e., copies of the same bit in register DBPST(A) and DBPST(B)) and indicates whether the DBOUT register is empty or full. Since there is only one Host to receive output words from either DSP 200a, 200b, one ORDY flag is sufficient. Furthermore, at any given time only one DSP is expected to send words to the PC Debugger. In the following text, the term ORDY references the ORDY but generally for both DSPs 200a, 200b, although each DSP 200a, 200b can read only its corresponding ORDY(A/B) bit from its own DBPST(A/B) register.

In contrast, each DSP 200 has its own IRDY bit (set by hardware, read-writable by a given DSP) that indicates whether register DBIN has a pending word for that DSP 200. Since only one DBIN register is shared among both DSPs 200a, 200b, only the intended recipient of the incoming word has its IRDY bit set. The IRDY bit also indicates to the given DSP whether a received interrupt (DEBUG_INT) was for reading from (IRDY=1) or writing to (ORDY=1 and IRDY=0) the PC Debugger.

The DBINT field is read-writable and exists in order to ensure that only the DSP 200a, 200b targeted for a particular debug message receives the DEBUG_INT interrupt and also that only its IRDY bit is updated for input data words following the command word.

The pair of bits DBINT(A/B) (from the DBPST(A) and DBPST(B) registers, respectively) determine the three valid states of the Debug port hardware: 00=Command_Parse Mode, 10=INT DSPA Mode, and 01=INT DSPB Mode. Each DSP 200 can set or clear its own DBINT bits. The invalid state of 11 will set the DBERR bits in DBPST(A/B) and will also result in an interrupt for both DSPs. Just like the ORDY bit, the DBERR(A) and DBERR(B) error bits are also copies of the same DBERR bit. The Debug ISR on each DSP 200 first checks DBERR and aborts to an error handler if a clash is detected.

When selected, Command-Parse Mode (DBINT(A/B)= 00) has a special effect during reads from the Host. When the debug port receives the incoming command word into the DBIN register, the hardware issues the DEBUG_INT interrupt and updates appropriate IRDY bit only for the DSP 200 specified in the A/B_field of register DBIN. However, in the case of writes to the Host, after the Host has pulled out the outgoing word from the DBOUT register, no interrupts are generated to any DSP 200a, 200b. Thus, the hardware will operate in this Mode for the first (or only) word of an incoming message.

In INT DSPA (interrupt DSPA) Mode (DBINT(A/B)=10), every 24-bits shifted in (or out) generates interrupt DEBUG_INT and sets the IRDY(A) bit only (or the ORDY bit for output). Likewise, in INT DSPB (interrupt DSPB) Mode (DBINT(A/B)=01), every 24-bits shifted in (or out) generates a DEBUG_INT and sets the IRDY(B) bit only (or the ORDY bit only for output). Debug ROM microcode has the burden of ensuring that the states of DBINT(A/B) are correctly switched (including the DBERR checking bits) by the appropriate DSP 200a, 200b to cover all debug scenarios.

The IRDY and ORDY bits are effectively WRITE_BUSY and READ_BUSY signals to the PC Debugger. The active-low ACK mentioned above is therefore generated as the logical OR of the IRDY(A) bit and the IRDY(B) bit for writes by the Host. Since ORDY(A)==ORDY(B)==ORDY (identical for both DSPs 200a, 200b), it is directly used for the active-low ACK (acknowledge) during reads by the Host. Thus, the PC Debugger can write to the decoder 100 only it both DSP 200a, 200b report no pending input words (this implies that the previous word has been read and processed). Also, the PC Debugger can read from the decoder only if a pending output word is indicated.

Figure 5A:
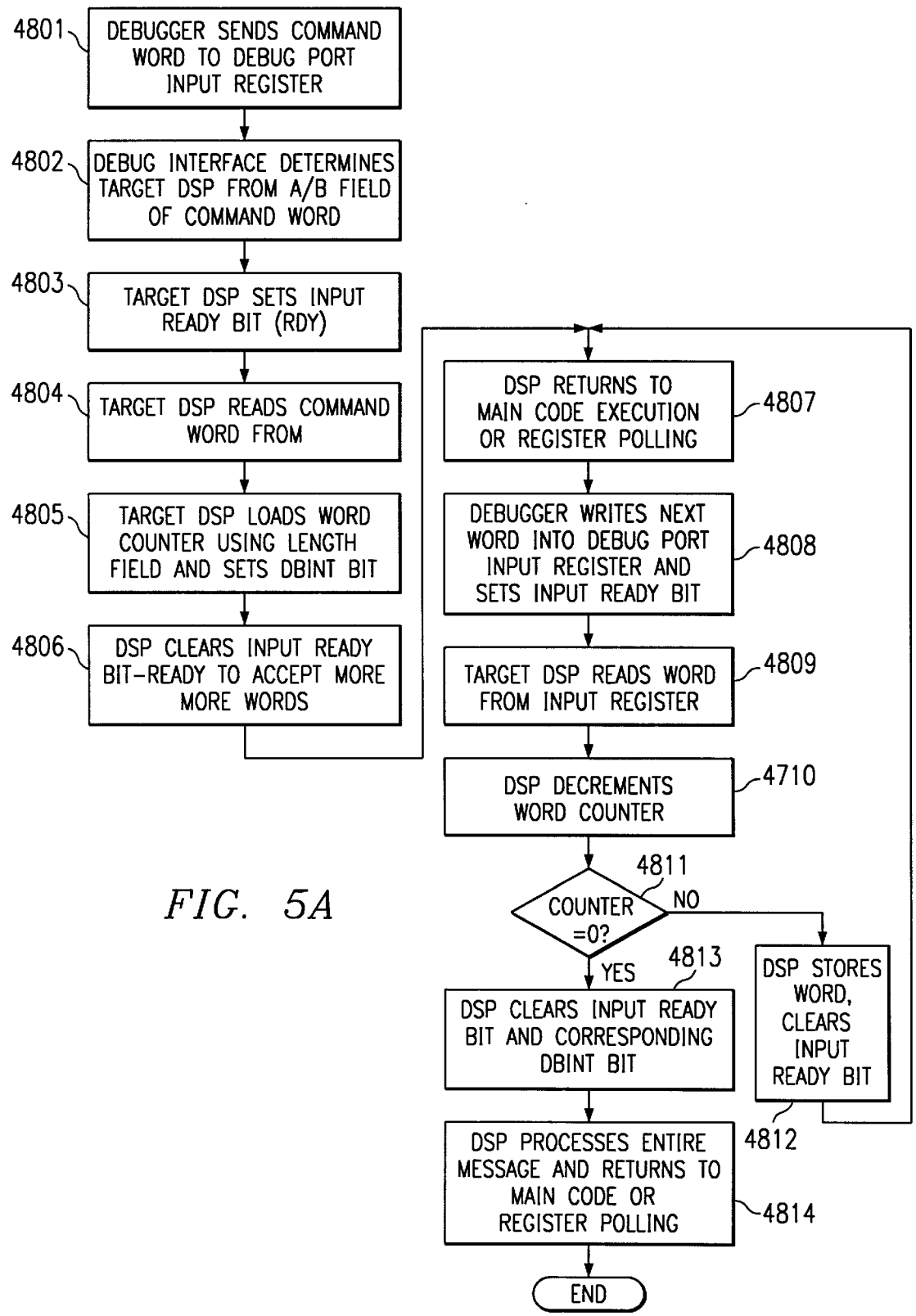
FIG. 5A is a diagram illustrating a typical debugging session between an external debugger and the decoder referenced from the debugger.
Figure 5B:
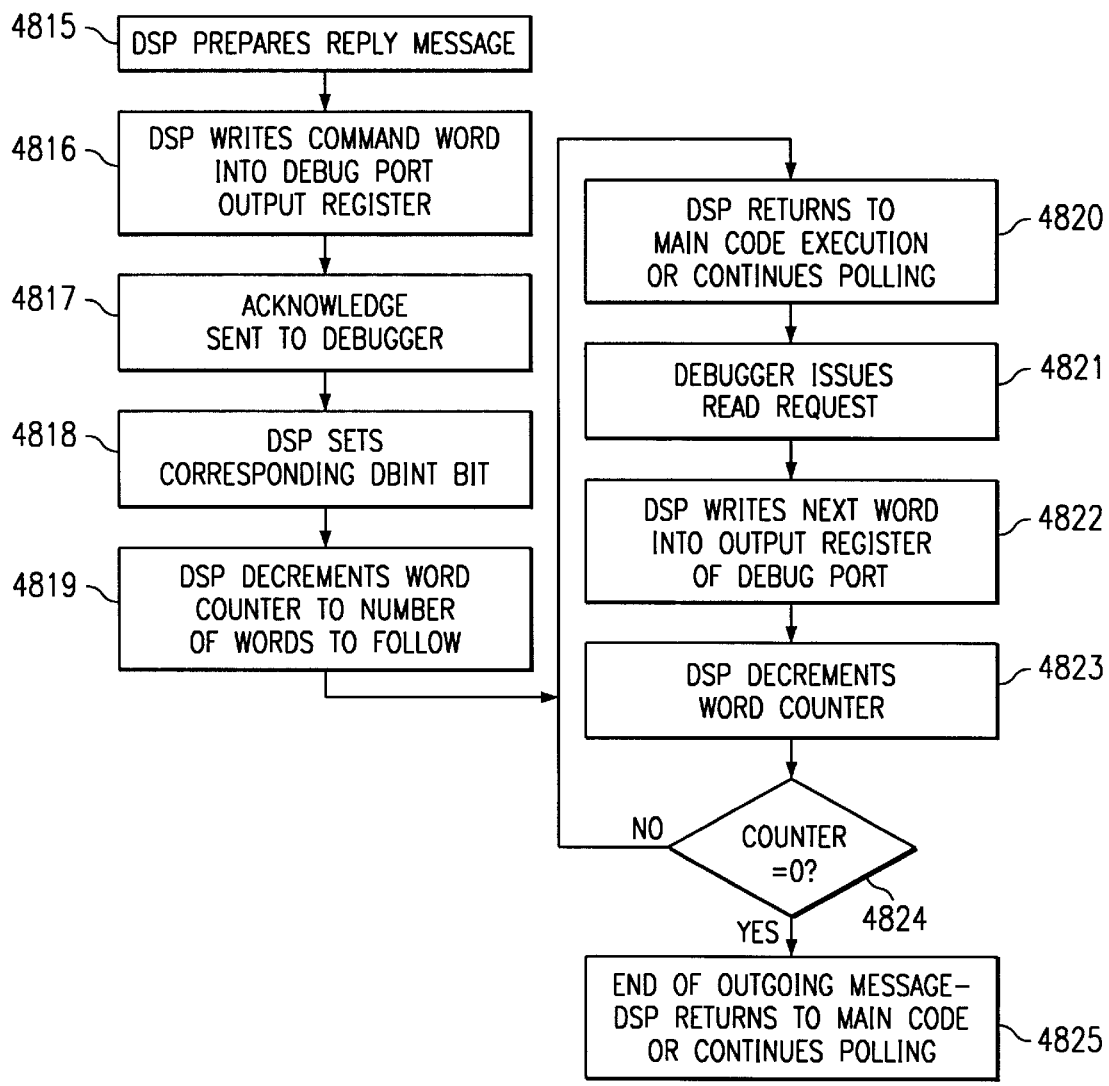
FIG. 5B is a diagram illustrating a typical debugging session between an external debugger and the decoder referenced from the decoder.

A typical Non-Intrusive debug session is detailed below in conjunction with FIG. 5A. The session is initiated by a message from the PC Debugger to debug port 1304 of decoder 100.

Using an ACK (acknowledge) handshake, the PC Debugger shifts in the first 24-bits of the message, i.e., the command word, into debug register DBIN (Step 4801). Since DBINT(A/B)==00 at startup, hardware issues DEBUG_INT to DSPA or DSPB depending on the value of the A/B_field of the command word (Step 4802). Hardware also sets the corresponding input ready bit IRDY(A) or IRDY(B) according to the value of the A/B_field.

Without loss of generality, assuming that A/B_==1, the IRDY(A) bit is set, and DSPA is at Step 4803. If target DSPA is executing main code, DSPA main code execution is interrupted. If target DSPA has been simply polling the debug port registers, for debug words from the debugger. DSPA continues to poll those registers. DSPA then jumps to the Debug ISR and confirms that DBERR==0 (if not, Debug_Error_Handler is invoked). Then DSPA determines a read condition by checking that bit IRDY(A)==1, and then reads in the command word from the DBIN register at Step 4804.

Next, DSPA determines from the length field that, for example, two more words are yet to arrive from the Host, sets a word-counter to two, and also sets the DBINT(A) bit to 1 (Step 4805). The DBINT bit, when sent, insures that all the following words are passed directly to the target DSP. DSPA then explicitly clears the IRDY(A) bit (Step 4806), which in turn enables an active-low ACK to the PC Debugger (since bit IRDY(B)==0 all along) to write more words if necessary, (two more words in this case). When the DBINT (A/B) bits=10, the debug port instructed to interrupt DSPA when the next word arrives, and if DSPA is executing main code, returns DSPA to the main code (Step 4807). Otherwise, DSPA continues polling the debug register for a new word.

When the PC Debugger writes the next twenty-four bits into the DBIN register (Step 4808)(after the correct handshake), and a DEBUG_INT is again generated to DSPA and, the IRDY(A) bit is set high, since bits DBINT (A/B)==10. If DSPA is executing main code, DSPA accepts the interrupt, if no debug error is detected, DSPA again determines that a read is pending by verifying that bit IRDY(A)==1, and reads in the 24-bit data from DBIN (Step 4809). (Alternatively, DSPA may only be polling for a change in bit IRDY, and no interrupt is necessary).

DSPA then decrements the word-counter (Step 4810). If the word-counter is non-zero (Step 4811), DSPA simply saves the current message-word, and explicitly clears IRDY (A), which enables ACK to the PC Debugger (Step 4412). The previous setting of bits DBINT(A/B)==10 is retained here. Once the word-counter reaches zero (Step 4811)(all words in incoming message received), DSPA clears DBINT (A) and explicitly clears the IRDY(A) bit (Step 4813). Thus, bit DBINT(A/B)==00, which indicates the end of the incoming message, and the debug port is reset to the default Command-Parse Mode. DSPA then processes the received debug message and accordingly continues with maincode, if being executed, or returns to polling the debug registers and initiates a reply back to Host (Step 4814) if necessary.

In the event that a reply is required to the PC Debugger, the decoder 100 responds with a similar transaction (in the reverse direction) for which the PC Debugger is waiting. Such a message is always in response to a request from the PC Debugger since unsolicited messages are precluded in the decoder 100 debug scheme.

In the event that a reply is solicited by the PC Debugger (FIG. 5B), still within the Debug handler initiated by the last incoming word, DSPA processes the complete incoming message (command word plus any associated data) and prepares, for example, a three-word message (command plus two data words) to be sent back to the PC Debugger (Step 4815). The PC Debugger is expecting this response (since it requested it), and is spinning in a loop, issuing read requests, and waiting for active-low ACK (bit ORDY(A)==bit ORDY (B)==ORDY). Since DBOUT is empty to begin with, ORDY=1, and the PC Debugger receives negative (high) ACKS. DSPA initiates the reply message by writing the command word (first word of reply message) into the DBOUT register (Step 4816). This clears ORDY (output ready) bit (ORDY=0) and in turn enables the active-low acknowledge (ACK) to the PC Debugger (Step 4817). DSPA then decrements the word-counter (to two), and since there are more words to be sent, it writes DBINT(A/B)=10 (Step 4818)and returns to maincode execution, if maincode was running, or continues to poll the debug I/O registers (Step 4820).

When the PC Debugger reads the twenty-four bits from debug output (DBOUT) register (after receiving the active-low ACK), the output ready (ORDY) bit goes high, and a DEBUG_INT interrupt is again generated to DSPA since bits DBINT(A/B)==10. DSPA either accepts an interrupt or polls the debug I/O registers (Step 4821) and determines that a write is pending since bit IRDY(A)==0 (checking bit ORDY==1 is not necessary since bit IRDY(A)==0 and the DEBUG_INT interrupt implies that ORDY==1), and then writes the next 24-bit word of the outgoing message into register DBOUT (Step 4822). DSPA then decrements the word-counter (Step 4823), and if it is non-zero, returns to maincode (leaving bit DBINT(A)==1) until the next DEBUG_INT. If the counter went to zero (Step 4824), DSPA clears the DBINT(A) bit. This effectively indicates the end of the outgoing message, and reverts the debug port hardware to Command-Parse Mode (bits DBINT(A/B)==00). DSPA then returns to maincode until a new debug session is initiated by the PC Debugger.

Slave Mode debugging is very similar to the Non-Intrusive Mode example described above. First, DSP(A/B) is explicitly halted by the PC Debugger using a HALT command, or if DSP(A/B) 200a/200b hit a breakpoint previously set by the PC Debugger. Once halted, the given DSP 200a, 200b spins in a Slave loop polling the IRDY(A/B) bits rather than returning to maincode. The PC Debugger sends the DSP(A/B) 200a/200b messages that are interpreted, processed, and responded to (if required) in much the same way as in the Non-Intrusive Mode. The DBINT settings are managed in the same manner as in Non-Intrusive Mode, which enables the appropriate update of the IRDY(A/B) bits, and possibly a debug interrupt to the other DSP if it is in Non-intrusive mode.

A debug message consists of a command word followed by associated data, if any. Commands are classified as CONTROL commands, WRITE commands, and READ commands. The first two types of commands are unidirectional, i.e., from the PC Debugger to decoder 100. READ commands are bi-directional: first, the PC Debugger sends a one-word READ REQUEST to decoder 100. After processing the request, decoder 100 (either DSPA or DSPB, as requested) sends back a READ RESPONSE. The READ REQUEST and READ RESPONSE have identical opcode syntax. However, any length information in the READ REQUEST is not interpreted as length of the incoming Request message. Instead it is treated as the length associated with the READ RESPONSE message.

In sum, the principles of the present invention allow for efficient and accurate debugging of combination hardware and software systems. These principles may be advantageously applied to multiprocessor systems, and in particular multiprocessor audio decoder systems.

Decoder 100 does not restrict any messages in Non-Intrusive Mode or Slave Mode. All control commands are either applicable in Non-Intrusive Mode or Slave Mode, but not both. All WRITE and READ commands are valid in either mode. The PC Debugger has the responsibility to access only appropriate subsets of messages during each mode, both from the perspective of validity, as well as induced overhead in Non-Intrusive Mode.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method of debugging a multiple processor device fabricated on a single-chip using an external debugger comprising the steps of:

receiving a first word of a sequence of words transmitted in serial from the external debugger and forming a message in a register;

determining a target processor from the first word;

interrupting the target processor;

the target processor setting an input ready bit in a status register;

reading the first word from the register by the target processor;

determining a number of words of the sequence to follow the first word from the first word, the sequence of words forming a debugging message;

setting a word counter to a value indicating the number of words of the sequence to follow the first word; decrementing the word counter value;

clearing the input ready bit using the target processor when the value in the word counter is a predetermined value; and returning target processor to main code execution.

2. The method of claim 1 and further comprising the steps of:

receiving a second word in the register;

setting the input ready bit;

interrupting the target processor;

reading the second word from the register with the target processor;

decrementing the word counter;

determining a resulting value in the word counter;

if the resulting value in not a zero value, performing the substeps of:
  storing the second word in memory associated with the target processor;
  clearing the input ready bit with the target processor; and
  returning the target processor to main code execution.

3. The method of claim 2 wherein if the counter has reached a zero value and further comprising the substeps of:

clearing the input ready bit;

the target processor returning from interrupt and processing the sequence of words stored in the memory associated with the target processor.

4. The method of claim 1 wherein the method of operating a multiple processor device comprises the method of operating a multiple processor audio decoder.

5. The method of claim 1 wherein the method of operating a multiple processor device comprises the method of debugging a multiple processor audio decoder.

6. The method of claim 1 wherein the step of determining the target processor comprises the step of interpreting a field in the first word with interface logic receiving the first word.

7. The method of claim 1 wherein the step of determining the number words to follow the first word comprises the step of interpreting a field in the first word with the target processor.

8. A method of communicating between a multiple digital signal processor audio decoder and an external debugger comprising the steps of:

preparing a debugging message for a selected one of the digital signal processors within the decoder;

writing a command word into an output register of the decoder using the selected one of the digital signal processors;

setting a word counter with the selected digital signal processor to a value indicating the number of words of the debugging message to follow the command word;

decrementing the word counter value using the selected digital signal processor;

determining with the selected digital signal processor that the debugger is requesting a new debugging message when the value in the word counter is a predetermined value; and writing a word of the new debugging message into the output register using the selected digital signal processor.

9. The method of claim 8 and further comprising the steps of:

after said step of decrementing the value in the word counter, determining if the value in the word counter has reached zero;

if the value in the word counter has reached zero, return the processor to main code execution at end of message;

if the value in the word counter has not reached zero, return processor to main code execution and until next read request from debugger.

10. The method of claim 8 wherein the digital signal processor is a selected one of a plurality of digital signal processors forming the decoder.

11. The method of claim 10 and further comprising the steps of:

after said step of writing the command word into the output port, sending an acknowledge from the decoder to the debugger; and setting a bit indicating a selected processor of a plurality of processors within the decoder sending the message.

12. The method of claim 8 wherein said step of determining comprises the step of polling a register bit controlled by the debugger.

13. The method of claim 8 and further comprising the step of returning the processor to main code execution after said steps of decrementing.

14. The method of claim 13 wherein said step of determining comprises the step of receiving an interrupt from the processor and the method further comprises the step of interrupting main code execution.

* * * * *